United States Patent
Boone et al.

[11] Patent Number: 5,129,863
[45] Date of Patent: Jul. 14, 1992

[54] VEHICLE TRANSMISSION

[75] Inventors: James A. Boone, Quinter; Thomas J. Snavely, Peabody, both of Kans.

[73] Assignee: Quinstar Corporation, Quinter, Kans.

[21] Appl. No.: 700,565

[22] Filed: May 15, 1991

[51] Int. Cl.$^5$ .............................................. F16H 7/00
[52] U.S. Cl. .......................................... 474/84; 474/86
[58] Field of Search ..................................... 474/84–86, 474/116, 148, 149; 180/363, 373

[56] References Cited

U.S. PATENT DOCUMENTS

| | | | |
|---|---|---|---|
| 3,715,928 | 2/1973 | Case et al. | 474/86 X |
| 4,768,997 | 9/1988 | Page et al. | 474/84 |
| 5,012,632 | 5/1991 | Kuhn et al. | 474/84 |

Primary Examiner—Thuy M. Bui
Attorney, Agent, or Firm—Litman, McMahon & Brown

[57] ABSTRACT

A transmission for a vehicle allows independent forward, reverse and neutral operation of two independent drive wheels. The transmission includes a gearbox with a pair of output shafts. A transfer wheel with a cylindrical friction surface and a belt pulley is mounted on each output shaft. A drive pulley is associated with each drive wheel. Each drive pulley is rotatable and pivotally mounted relative to the gearbox and has a cylindrical surface and a coaxial belt pulley thereon. A belt is reeved over each of the belt pulleys. Each drive pulley is swingable between alternative configurations where the surfaces engage and the belt is loose so as to drive the drive pulley in one direction, where the belt is taut to drive the drive pulley in an opposite direction and where the surfaces do not engage and the belt is loose so as to be in neutral. Each drive pulley is operably connected to a respective drive wheel. Operator controls, a dampening mechanism and a return to neutral mechanism are operably connected to each drive pulley.

13 Claims, 2 Drawing Sheets

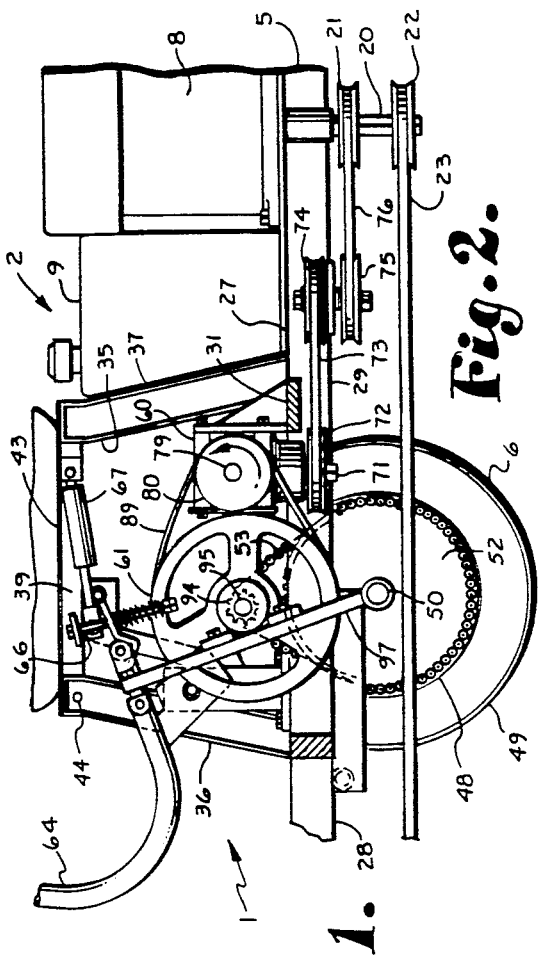
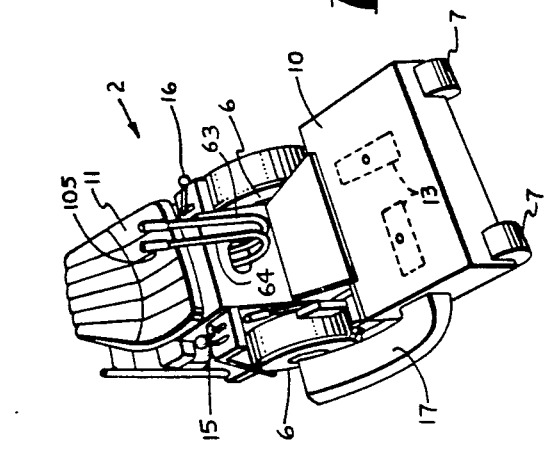
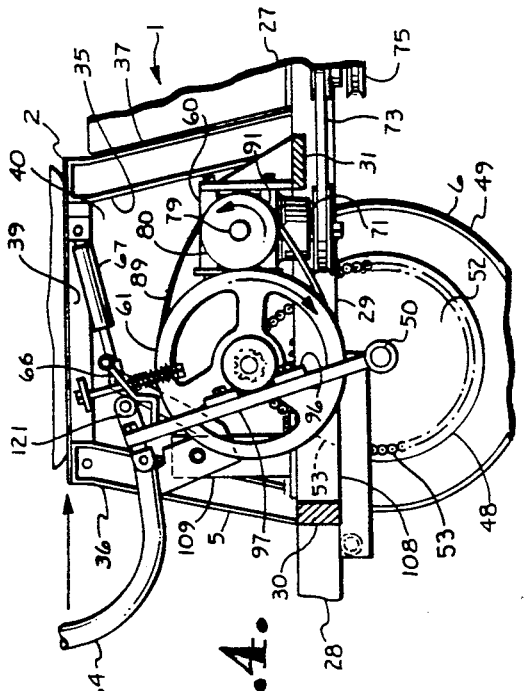
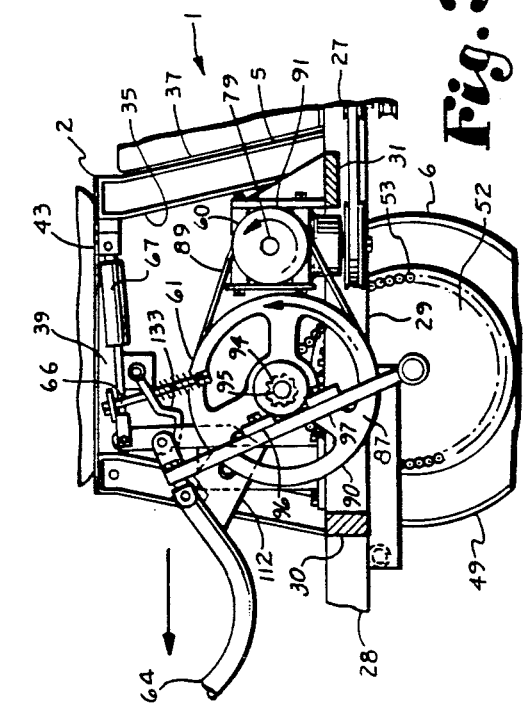

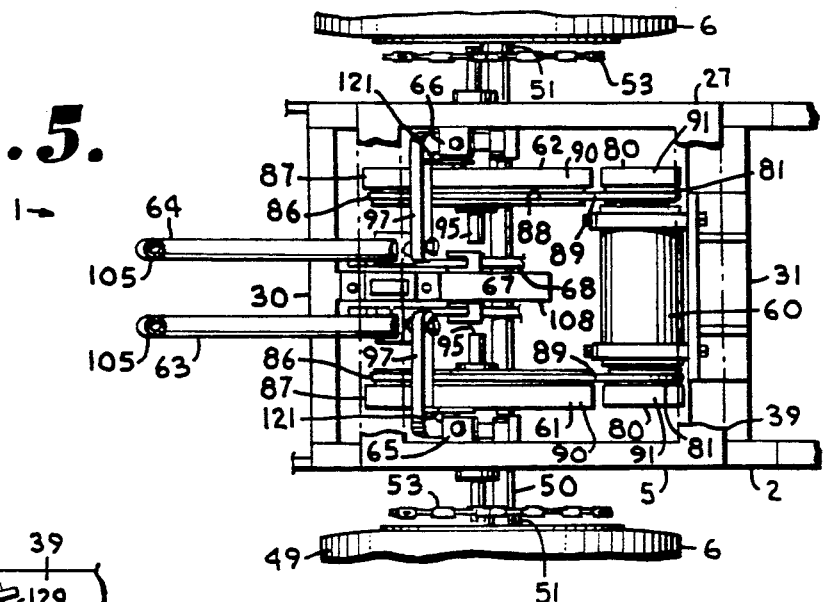
Fig. 5.
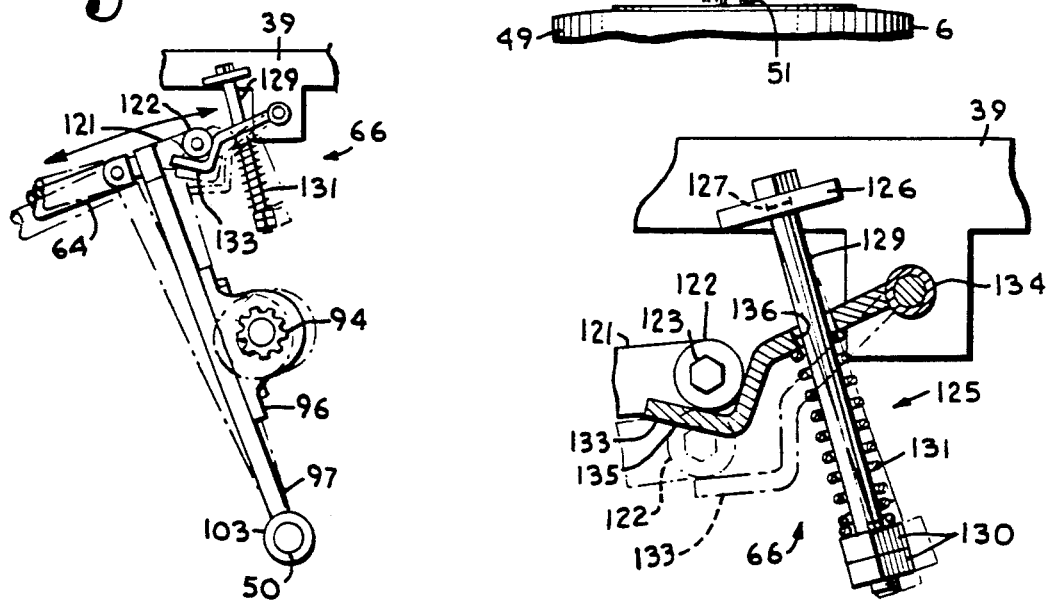
Fig. 6.
Fig. 7.
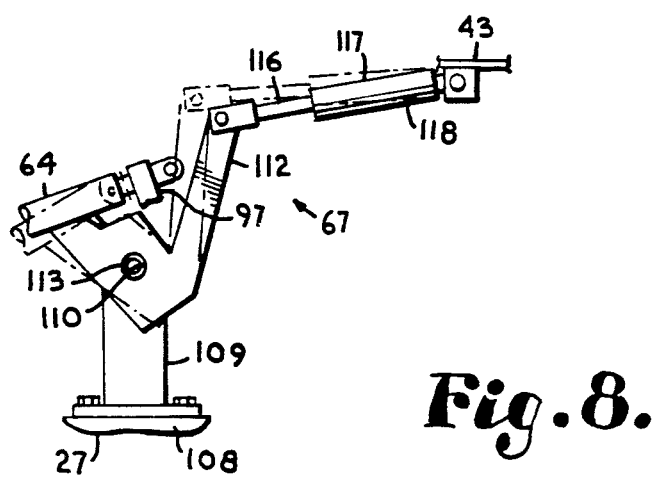
Fig. 8.

5,129,863

VEHICLE TRANSMISSION

BACKGROUND OF THE INVENTION

The present invention relates to a vehicle transmission for use in conjunction with self-propelled vehicles which turn on a very small radius or zero radius and, in particular, to such transmissions which selectively and independently link both forward and reverse drive to a pair of drive wheels for the vehicle.

Vehicles of the type which are commonly referred to as zero turning radius vehicles have become quite popular for various purposes especially mowing where it is sometimes necessary for the mower to make quite sharp turns. For example, mowers of this type are used for mowing about headstones in a cemetary wherein a number of sharp turns must be made in order to be able to cut all the grass. The zero turning radius mowers also significantly reduce the time required to mow a particular region as compared to conventional mowers that do not have the zero turning radius ability.

In order to provide for zero turning radius capability in a mower or the like, it is necessary to allow the operator the ability to independently control the forward and reverse speeds on at least a pair of the drive wheels for the vehicle. In this manner, the operator can, for example, stop the left drive wheel and have the right drive wheel go forward such that the vehicle pivots about the left drive wheel and, thus, effectively turns on a "zero radius". Prior zero turning radius vehicles have typically required a sophisticated transmission mechanism for allowing the operator to selectively transfer power to the drive wheels.

A common method of independently driving the rear wheels in the past has been to provide independent hydraulic transmissions for each of the drive wheels of the vehicle. While such transmissions are effective in producing a zero turning radius capability, they can also be quite expensive, or quite complex and are prone to breakdowns of the type that cannot be repaired by a typical user of the mower, thereby requiring the user to return the transmissions to a specialized dealer for repair.

Consequently, it is desirable to have a relatively simple mechanical apparatus which is comparatively easy to repair and relatively inexpensive as compared to prior devices of this type and yet which function highly effectively as a transmission for use in conjunction with zero turning radius vehicles. It is also desirable to provide such a transmission which provides a degree of dampening to prevent jerky motion and which effectively returns the controls to neutral, should be user's hands leave the control mechanisms for the apparatus, thereby reducing the chance of injury to the user should the user fall from the machine or the like.

SUMMARY OF THE INVENTION

The present invention is directed to a transmission for use in conjunction with motorized self-propelled vehicles which allows the user of the vehicle to independently control the forward and reverse speeds of drive wheels for the vehicle. The transmission allows both drive wheels to be driven in the same direction at the same speed, one or both wheels to be in neutral or one wheel to be driven in one direction and the other in the opposite direction.

A suitable vehicle for use in conjunction with the transmission can be any type of vehicle requiring independent control of the drive wheels and is especially suited for use in conjunction with a mower mechanism wherein the mower is required to turn at sharp angles during use. Preferably, the vehicle has at least two spaced drive wheels which are independently operated by a respective transmission in accordance with the present invention and at least one further guide wheel which is not driven. Also, preferably, the two drive wheels are mounted along a common axis of rotation such that when one of the drive wheels is stopped, the other drive wheel can be either run in reverse or forward to pivot the vehicle about the stopped drive wheel.

OBJECTS OF THE INVENTION

Therefore, the objects of the present invention are: to provide a transmission for a mobile vehicle that allows a user of the vehicle to independently select forward or reverse rotation for each of the drive wheels thereof and also allows placement of each of the drive wheels independently into a neutral position; to provide such a transmission having a gearbox that cooperates with a motor to operably drive a pair of transfer wheels or pulleys for each of the drive wheels in opposite directions about a single axis of rotation and to provide a cooperating set of second intermediate drive wheels or pulleys rotating about a second axis of rotation spaced from the first axis of rotation and further providing circumferentially extending frictional surfaces on a first set of opposed intermediate wheels and a belt receiving surface on a second set of opposed intermediate wheels with a belt reeved between the belt receiving surfaces such that said second set of intermediate wheels have a first position relative to the first set of intermediate wheels wherein the frictional surfaces engage one another and thereby drive the second set of wheels in one rotational direction and a second configuration wherein the belt is taut and the frictional surfaces are spaced apart such that the second set of intermediate wheels is driven in a second opposed direction to the first direction; to provide such a transmission having a neutral position wherein the second set of intermediate wheels is not driven in either direction; to provide such a transmission having an operator's set of controls allowing an operator to selectively move the second set of wheels between the first and second configuration thereof; to provide such a transmission having a dampening mechanism to dampen the movement of the second set of intermediate wheels between the first and second configurations thereof; to provide such a transmission having a biasing mechanism for urging the transmission to the neutral configuration thereof should the operator release the operator's grasp of the control mechanism; to provide such a transmission which is relatively easy to construct, simple to repair, inexpensive in cost and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a self-propelled mobile vehicle having a mower mechanism and a transmission in accordance with the present invention for driving a pair of drive wheels thereof.

FIG. 2 is an enlarged and fragmentary cross-sectional view of the vehicle showing the transmission in a neutral configuration.

FIG. 3 is an enlarged and fragmentary cross-sectional view of the vehicle showing the transmission in a forward drive configuration.

FIG. 4 is an enlarged and fragmentary cross-sectional view of the vehicle showing the transmission in a reverse drive configuration thereof.

FIG. 5 is an enlarged and fragmentary top plan view of the vehicle with portions removed to show detail thereof.

FIG. 6 is a schematic, side elevational view of a portion of the transmission of the present application showing a drive pivot arm and a return to neutral mechanism thereof, with certain alternative configurations shown in phantom lines.

FIG. 7 is a schematic side elevational view of the return to neutral mechanism illustrating a second configuration of the return to neutral mechanism in phantom lines.

FIG. 8 is a schematic side elevational view of a portion of the transmission of the present invention showing a dampening mechanism associated with the drive pivot arm in a first configuration in solid lines and in a second configuration in phantom lines.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a vehicle transmission and control apparatus in accordance with the present invention mounted in a zero radius turning vehicle 2. In the present embodiment, the vehicle 2 is a riding lawnmower.

The vehicle 2 includes frame means such as is illustrated by a structural frame 5 supported by a pair of rear drive wheels 6 and a pair of front guide wheels 7, a gasoline powered motor 8, a fuel supply tank 9, a deck 10 for supporting the operator and shrouding mower blades 13 within, and a driver's seat 11. Mounted on the frame 5 adjacent the right hand side of the seat 11 are motor controls 15 which operably control the speed at which the motor 8 operates and on the left hand side of the seat 11 is a lever arm 16 for allowing an operator to selectively engage and disengage rotation of the blades 13 by a mechanism frequently used in riding mowers and not further described herein. A chute 17 directs discharge of clippings from beneath the deck 10 as the clippings are cut by the blades 13.

As is seen in FIG. 2, the motor 8 has a drive shaft 20 which extends downwardly therefrom and which is operably rotated by the motor 8 when the motor 8 is operating. Mounted on the downwardly extending end of the drive shaft 20 is a drive pulley 21 and a mower operating pulley 22. As used herein, the term "pulley" is preferably a wheel or wheel-shaped structure having a circumferential groove adapted to have a belt, such as a V-shaped belt or the like, received in the groove; however, it is forseen that other structures could function equivalently for this purpose and that a pulley could have a cylindrical-shaped outer surface or the like. The mower operating pulley 22 is connected by a drive belt 23 which is connected through a transfer gear (not shown) with the lever arm 16 to the mower blades 13 so as to selectively rotate the mower blades 13 when the operator places the lever arm 16 in an operating mode and to stop rotation of the blades 13 when the lever arm 16 is placed in a non-operating mode.

The frame 5 includes a rear carriage 27 fixedly joined to a forwardly extending member 28 upon which the deck 10 is mounted. The rear carriage 27 includes elongate side members 29 joined together by lateral members 30 including an intermediate lateral member 31. Extending upwardly from the front half of the rear carriage 37 is an enclosure 35 which surrounds the majority of the vehicle transmission and control apparatus 1. The enclosure 35 has a pair of forward uprights 36 and a pair of rearward uprights 37 located in the corners of the enclosure 35. The uprights 36 and 37 are joined at the top thereof by cross-members 39. Sidewalls 40 are utilized to cover the vertical sides of the enclosure 35. A top panel 43 covers the enclosure 35 and is pivotally connected at a front end thereof by pivot 44 such that the top panel is swingable about the pivot 44 to allow access to the enclosure 35. The seat 11 is fixedly attached to the top panel 43.

The rear drive wheels 6 each include a hub 48 with a pneumatic tire 49 mounted thereon. Each hub 48 is attached to an axle 50 extending therebetween such that each of the hubs 48 rotate freely upon the axle 50 but are held in a fixed axially spaced relationship with respect to one another. In this manner, the rear drive wheels 6 are coaxial with respect to one another but rotate independent from each other. Attached to each of the hubs 48 by a sleeve 51 is a drive gear 52. The drive gears 52 are attached to respective hubs 48 such that rotation of one of the drive gears 52 rotates the respective hub 48 and, consequently, the rear drive wheel 6 associated therewith. The outer periphery of the drive gear 52 is serrated such that each drive gear 52 receives wheel drive means such as is illustrated by a drive chain 53 which operably rotates a respective drive gear 52 and subsequently a respective rear drive wheel 6. The drive chains 53 can be seen located in place in FIG. 5. For purposes of showing interior detail, the left drive wheel and associated drive chain have been removed and are not shown in FIGS. 2, 3 and 4, although right drive wheel 6 and right drive chain 53 are shown.

The vehicle transmission and control apparatus 1 generally includes a gear box 60, left and right intermediate drive transfer means such as is illustrated by left and right drive pulleys 61 and 62, left and right control handles 63 and 64, left and right return to neutral means illustrated by return to neutral mechanisms 65 and 66, and left and right dampening means illustrated by dampening mechanisms 67 and 68 respectively.

The gear box 60 is attached to the intermediate lateral member 31 so as to be fixed in position with respect to the rear carriage 27. The gear box 60 includes a downwardly extending input shaft 71 having mounted thereon a pulley 72. The pulley 72 is, in turn, connected to and drive by a belt 73 that is also reeved about a second pulley 74. The second pulley 74 is axially connected to a third pulley 75 in such a manner that both pulleys 74 and 75 rotate simultaneously at the same speed and in the same direction. The third pulley 75 is, in turn, connected to the drive pulley 21 by a second belt 76. In this manner, rotation of the drive pulley 21 by the motor 8 causes a like rotation of the pulley 72 and the gear box input shaft 71.

The gear box 60 also has extending therefrom at right angles to the input shaft 71 a pair of output shafts 79 which are fixedly secured to a pair of reverse hubs 80 that are coaxially aligned and located on opposite sides of the gear box 60. The reverse hubs 80 are both driven in the same direction by rotation of the input shaft 71 by suitable gearing within the gear box 60. Located adjacent to each of the reverse hubs 80 but rotating independently therefrom are a pair of forward drive belt pulleys 81 which are positioned on opposite sides of the gear box 60 between the gear box 60 and respective adjacent reverse hubs 80. Each of the forward drive belt pulleys 81 is mounted upon a sleeved output shaft 84 which is sleeved on a respective output shaft 79. Each sleeved output shaft 84 is driven by the gear box 60 to rotate in the opposite direction with respect to an associated output shaft 79, such that the forward drive belt pulleys 81 continuously rotate in the same direction and in an opposite direction to the reverse hubs 80. It is noted that the function of the pulleys 81 and hubs 80 could be reversed by reversing the input to the gear box 60 and operating control as noted below in the opposite direction.

Each of the transfer drive pulleys 61 and 62 are divided into two cylindrical or circular halves 86 and 87 which are fixed together so that both halves 86 and 87 rotate coaxially together. Each drive pulley half 86 has an outer belt receiving groove 88 about which is reeved a belt 89 which also is reeved over the forward drive belt pulley 81 associated with the gear box 60. Each of the drive pulley halves 87 have a cylindrically shaped frictional surface 90 thereon which is aligned with a frictional surface 91 on a respective reverse hub 80. Each of the drive pulleys 61 and 62 are also attached to a coaxially rotating sprocket 94 which is sized, shaped and positioned to receive the drive chain 53 which drives a respective rear drive wheel 6.

Each of the sprockets 94 is attached to a respective drive pulley 61 or 62 by a respective coaxial shaft 95. Rotatably mounted on each of the shafts 95 is a pillow block 96 that is, in turn, attached to pivot means such as is illustrated by a swing or pivot arm 97. Each of the pivot arms 97 is an elongate shaft having a lower distal sleeve or bearing 103 attached thereto which is slidably received over the axle 50. The upper end of each of the pivot arms 97 is fixedly attached to a respective control handle 63 or 64. Each of the control handles 63 and 64 include an upper distal end having hand grips 105 that are held by an operator during use and urged forwardly or rearwardly in order to control operation of the respective left and right drive wheels 6.

In particular, attention is directed to FIGS. 2, 3 and 4 wherein, when a respective control handle 63 and 64 is urged fully forward, as is seen in FIG. 3, a respective pivot arm 97 and, consequently, a respective drive pulley 61 or 62 pivots forwardly about an axis that passes through the axle 50. When this occurs, the belt 89 becomes taut against both the belt receiving groove 88 and a respective forward drive belt pulley 81. Consequently, rotational drive is transferred from the gear box 60 to the respective drive pulley 61 or 62 so as to rotates a respective main drive wheel 6 in a forward direction. When the control handle 63 or 64 is urged to a full rearward position, as is shown in FIG. 4, the respective drive pulley 61 or 62 rotates rearwardly on a respective pivot arm 97 about an axis passing through the axle 50 such that the respective drive belt 89 becomes loose and no longer drives the drive pulleys 61 or 62 in a forward direction. When in a full reverse position, the surface 90 on the drive pulley engages a respective surface 91 on a reverse hub 80 so as to rotate the main drive pulley 61 or 62 in a reverse direction and, consequently, the associated rear drive wheel 6 in a reverse direction, as is seen in FIG. 4. When the main drive pulley 61 and 62 is in an intermediate position between the full forward and full reverse positions thereof, as is seen in FIG. 2, the belts 89 are slack and the pulley surfaces 90 do not engage the reverse hub surfaces 91 so that the associated drive wheel 6 is driven neither in a forward nor a reverse direction so that the apparatus 1 is in a neutral configuration thereof.

Extending rearwardly from the front lateral member 30 of the rear carriage 27 is a support bar 108. Fastened to and extending upright from the support bar 108 is a stanchion 109 having a bore 110 near the upper end thereof. Both the left dampening mechanism 67 and the right dampening mechanism 68 are connected to and interact with the stanchion 109 and with respective left and right control handles 63 and 64 as well as the pivot arms 97 associated therewith.

In particular, each of the control handles 63 and 64 extend generally forwardly and slightly downwardly from the pivot arms 97 associated therewith and then curve forwardly and upwardly to a generally vertical attitude during use, although the control handles 63 and 64 swing somewhat forwardly and backwardly during use. Attached to each of the control handles 63 and 64 forward on their attachment to respective pivot arms 97 are forward arms of respective bell cranks 112. The bell cranks 112 are pivotally attached to the stanchion 109 on opposite sides thereof by a pivot pin 113 that passes through the bore 110 in the stanchion 109.

Rearward or opposite arms of each bell crank 112 is pivotally connected to a piston 116 of a dampening pneumatic ram 117 having a cylinder 118 that is pivotally connected to the top panel 43 of the enclosure 35. In this manner, as one of the control handles 63 or 64 is motivated by an operator to a different position, the respective handle 63 or 64 operates to swing a respective bell crank 112 about the pivot pin 113 which, in turn, swings the opposite arm of the bell crank 112 to urge the associated piston 116 of the ram 117 in or out of a respective cylinder 118. The ram 117 is of a conventional type which applies a resistance to the movement of the piston 116 in either direction such that movement of the control handles 63 or 64 is not jerky but rather dampened and smooth. Operation of the left dampening mechanism 67 is shown in FIG. 8 separated from the remainder of the vehicle 2.

Operation of the right return to neutral mechanism 66 is best shown in FIGS. 6 and 7 which is also illustrative of operation of the left mechanism 65. In particular, each of the pivot arms 97, near where same are joined to the control handles 63 and 64, have extending outwardly therefrom to the left and right respectively an arcuate arm 121 fixedly attached at one end thereof to a respective pivot arm 97 and having a roller 122 secured by a pivot bolt 123 to the opposite end of each of the arcuate arms 121. The rollers 122 are generally coaxially aligned when the transmission apparatus 1 is in neutral. The rollers 122 are positioned on opposite sides of the enclosure 35 and engage biasing means such as illustrated by a biasing mechanism 125. Each of the biasing mechanisms 125 include a plate 126 that is fixedly attached to the side of the enclosure 35 by welding or the like and which includes a bore 127 therethrough. Mounted within the bore 127 is an elongate and cylindrically shaped detente rod 129 that is threaded at a lower end thereof opposite the plate 126. Mounted on the threaded end of the rod 129 is a pair of locking nuts 130 upon which are mounted a detente spring 131 that slides along the detente rod 129 and is coaxially received thereabout.

Each of the left and right return to neutral mechanisms 65 and 66 further include a detente hand 133 pivotally secured to the side of the enclosure 35 by a detente pivot pin 134. The detente hand 133 has a V-shaped section 135 spaced from the detente pivot pin 134. Intermediate between the V-shaped section 135 and the pin 134 is a bore 136 which slidingly receives a respective detente rod 129. The detente spring 131 is compressed between the nuts 130 and the detente hand 133 so as to urge the detente hand 133 upwardly. The detente hand 133 is sized and shaped to receive a respective roller 122 in the bottom of the section 135 when the transmission apparatus 1 is in a neutral configuration, as is shown in FIG. 2 and also in FIG. 7 in solid lines. When either of the control handles 63 or 64 are moved either forwardly or rearwardly by an operator, a respective roller 122 rides up one side or the other of the V-shaped section 135 corresponding to movement of a respective pivot arm 97 so as to urge the detente hand 133 downwardly against the spring 131. This places a bias upon the detente hand 133 to return to the most stable equilibrium position which is when the roller 122 is at the bottom of the V-shaped section 125, as is shown in solid lines in FIG. 7. In this manner, if an operator takes the their hands off of the control handles 63 or 64, the return to neutral mechanism 65 and 66 urge the respective rollers 122 to return to the neutral position thereof which, in turn, urges the control handles 63 and 64 and, consequently, the drive pulleys 61 and 62 to return to the neutral positions thereof such that the rear drive wheels 6 are no longer powered by the motor 8, as is shown in FIG. 2. Subsequently moving one of the control handles 63 or 64 forward allows independent forward thrust to be applied to the individual rear drive wheels 6 associated therewith such that each of the drive wheels 6 can be independently driven forward. Likewise, movement of the control handles 63 or 64 rearwardly allows independent control of the rear drive wheels 6 in a rearward direction.

It is to be understood that while certain forms of the present invention have been illustrated and described herein, it is not to be limited to the specific forms or arrangement of parts described and shown.

What is claimed and desired to be secured by Letters Patent is as follows:

1. A transmission for a mobile vehicle comprising:
   (a) structural frame means;
   (b) a gearbox mounted on said frame means and having a rotary input mechanism adapted to be driven by a power source; said gearbox having an output axis having mounted therealong so as to rotate therewith a first cylindrical friction surface and a first belt pulley;
   (c) pivot means supported by said frame means;
   (d) a second cylindrical friction surface and second belt pulley mounted on said pivot means so as to be pivotable with respect to said frame; said first and second cylindrical friction surface and said first and second belt pulleys being movable relative to each other respectively by movement of said pivot means so as to have a first configuration wherein said first and second cylindrical friction surfaces frictionally and tangentially engage one another and a second configuration wherein said surfaces are spaced from one another;
   (e) belt means reeved about said first and second belt pulleys; said belt means being sized so as to be loose when in said first configuration such that said first belt pulley does not rotate said second belt pulley and being taunt when in said second configuration so that said first belt pulley operably drives said second drive pulley;
   (f) wheel driving means operably connected to and rotated selectively by said second friction surface and said second belt pulley when said transmission is in said first and second configuration respectively and being adapted to rotate a drive wheel; and
   (g) operator control means for allowing an operator to selectively shift between said first and second configurations.

2. The transmission according to claim 1 wherein:
   (a) said pivot means includes a pivot arm pivotally mounted on said frame means at one end thereof.

3. The transmission according to claim 2 wherein:
   (a) said operator control means includes an operator control arm attached to said pivot arm.

4. The transmission according to claim 1 wherein:
   (a) said second cylindrical friction surface and said second belt pulley are coaxially mounted in side-by-side relationship and joined to coaxially rotate and form a drive pulley.

5. A transmission for a mobile vehicle comprising:
   (a) structural frame means;
   (b) a gearbox mounted on said frame means and having a rotary input mechanism adapted to be driven by a power source; said gearbox having an output axis having mounted therealong so as to rotate therewith a first cylindrical friction surface and a first belt pulley;
   (c) pivot means supported by said frame means;
   (d) a second cylindrical friction surface and second belt pulley mounted on said pivot means so as to be pivotable with respect to said frame; said first and second cylindrical friction surface and said first and second belt pulleys being movable relative to each other respectively by movement of said pivot means so as to have a first configuration wherein said first and second cylindrical friction surfaces frictionally and tangentially engage one another and a second configuration wherein said surfaces are spaced from one another;
   (e) belt means reeved about said first and second belt pulleys; said belt means being sized so as to be loose when in said first configuration such that said first belt pulley does not rotate said second belt pulley and being taunt when in said second configuration so that said first belt pulley operable drives said second drive pulley;

(f) wheel driving means operably connected to and rotated selectively by said second friction surface and said second belt pulley when said transmission is in said first and second configurations respectively and being adapted to rotate a drive wheel;

(g) operator control means for allowing an operator to selectively shift between said first and second configurations; and (h) dampening means for operably dampening the shift between said first and second configurations.

6. The transmission according to claim 5 wherein:
(a) said dampening means include a dampening piston.

7. The transmission according to claim 5 wherein:
(a) said operator control means include a control arm;
(b) said dampening means include a bell crank medially and pivotally connected to said frame means and having first and second crank arms; said first crank arm being pivotally connected to said control arm and said second crank arm being pivotally connected to said dampening piston; and
(c) said dampening piston being a pneumatic ram being connected on one side thereof to said second crank arm and on an opposite side thereof to said frame means.

8. A transmission for a mobile vehicle comprising:
(a) structural frame means;
(b) a gearbox mounted on said frame means and having a rotary input mechanism adapted to be driven by a power source; said gearbox having an output shaft having mounted therealong a first cylindrical friction surface and a first belt pulley so as to rotate in the same direction;
(c) pivot means supported by said frame means;
(d) a second cylindrical friction surface and second belt pulley mounted on said pivot means so as to be pivotable with respect to said frame; said first and second cylindrical friction surface and said first and second belt pulleys being movable relative to each other respectively by movement of said pivot means so as to have a first configuration wherein said first and second cylindrical friction surfaces frictionally and tangentially engage one another and second and third configurations wherein said surfaces are spaced from one another;
(e) belt means reeved about said first and second belt pulleys; said belt means being sized so as to be loose when in said first and third configurations such that said first belt pulley does not rotate said second belt pulley and being taunt when in said second configuration so that said first belt pulley operably drives said second drive pulley;
(f) wheel driving means operably connected to and rotated selectively by said second friction surface and said second belt pulley and when said transmission is in said first and second configurations respectively and being adapted to rotate a drive wheel; said wheel driving means being in a neutral position thereof and undriven when said transmission is in said third configuration;
(g) operator control means for allowing an operator to selectively shift between said first, second and third configurations; and
(h) return to neutral means continuously urging said transmission into said third configuration and requiring operative pressure to be applied by an operator on said control means to move from said third configuration to said first and second configurations.

9. The transmission according to claim 8 wherein:
(a) said pivot means includes a pivot arm pivotally connected near one end thereof to said frame means and near an opposite end thereof to said control means;
(b) said return to neutral means include a roller attached to said pivot arm, a detente hand being pivotally attached at one end thereof to said frame means and having a V-shaped section at an opposite end thereof operably receiving said roller and biasing means for urging said roller to the center of said V-shaped section.

10. The transmission according to claim 9 wherein:
(a) said biasing means include a rod secured to said frame means; said rod passing through a medial bore in said detente hand; and
(b) a spring sleeved on said rod and operably biasing against an underside of said detente hand.

11. A transmission for a mobile vehicle having a pair of independently rotatable ground engaging drive wheels comprising:
(a) a structural frame;
(b) a gearbox mounted on said frame and having a rotary input mechanism adapted to be operably driven by motor means; said gearbox having a left output shaft having mounted coaxially therealong a first cylindrical friction surface and a first belt pulley; said gearbox having a right output shaft having mounted therealong a second cylindrical friction surface; and
(c) left and right pivot arms pivotally connected to and supported by said frame;
(d) left and right drive pulleys attached to said left and right pivot arms respectively;
(e) said left drive pulley having thereon a third cylindrical friction surface and an adjacent third belt pulley; said first and third cylindrical friction surface and said first and third belt pulleys being aligned and movable relative to each other respectively by movement of said left pivot arm so as to have a first configuration wherein said first and third cylindrical friction surfaces frictionally and tangentially engage one another and second and third configurations wherein said first and third surfaces are spaced from one another;
(f) said right drive pulley having thereon a fourth cylindrical friction surface and an adjacent fourth belt pulley; said second and fourth cylindrical friction surface and said second and fourth belt pulleys being aligned and movable relative to each other respectively by movement of said right pivot arm so as to have a fourth configuration wherein said second and fourth cylindrical friction surfaces frictionally and tangentially engage one another and fifth and sixth configurations wherein said second and fourth surfaces are spaced from one another;
(g) a first belt reeved about said first and third belt pulleys; said first belt being sized so as to be loose when in said first and third configurations such that said first belt pulley does not rotate said third belt pulley and being taut when in said second configuration so that said first belt pulley operably drives said third drive pulley;
(h) a second belt reeved about said second and fourth belt pulleys; said second belt being sized so as to be loose when in said fourth and sixth configurations such that said second belt pulley does not rotate said fourth belt pulley and being taut when in said fifth configuration so that said second belt pulley operably drives said fourth drive pulley;
(i) left drive means adapted to operably connect said left drive pulley with a left drive wheel such that the left drive wheel is rotated in the same direction as said left drive pulley and right drive means adapted to operably connect said right drive pulley to a right drive wheel such that the right drive wheel is rotated in the same direction as said right drive pulley; and
(j) left and right control means operably connected respectively to said left and right drive pulleys to allow an operator to selectively shift between said configurations.

12. The transmission according to claim 11 including:
(a) dampening means operably connected to said left and right control handles and operably providing resistance to a shift between configurations; and
(b) return to neutral means for operably urging said left drive pulley into said third configuration and said right drive pulley into said sixth configuration so as to require an operator to use force to move from said third configuration to said first and second configurations and to also use force to move from said sixth configuration to said fourth and fifth configurations.

13. A mobile vehicle comprising:
(a) a structural frame;
(b) left and right drive wheels coaxially mounted on an axle and being independently rotatable; said axle being mounted on said frame;
(c) a guide wheel mounted on said frame and positioned so as to be noncoaxially aligned with said drive wheels;
(d) motor means;
(e) a gearbox mounted on said frame and having a rotary input mechanism operably driven by said motor means; said gearbox having a left output shaft having mounted coaxially therealong a first cylindrical friction surface and a first belt pulley; said gearbox having a right output shaft having mounted therealong a second cylindrical friction surface; and
(f) left and right pivot arms pivotally connected to and supported by said frame;
(g) left and right drive pulleys attached to said left and right pivot arms respectively;
(h) said left drive pulley having thereon a third cylindrical friction surface and an adjacent third belt pulley; said first and third cylindrical friction surface and said first and third belt pulleys being aligned and movable relative to each other respectively by movement of said left pivot arm so as to have a first configuration wherein said first and third cylindrical friction surfaces frictionally and tangentially engage one another and second and third configurations wherein said first and third surfaces are spaced from one another;
(i) said right drive pulley having thereon a fourth cylindrical friction surface and an adjacent fourth belt pulley; said second and fourth cylindrical friction surface and said second and fourth belt pulleys being aligned and movable relative to each other respectively by movement of said right pivot arm so as to have a fourth configuration wherein said second and fourth cylindrical friction surfaces frictionally and tangentially engage one another and fifth and sixth configurations wherein said second and fourth surfaces are spaced from one another;
(j) a first belt reeved about said first and third belt pulleys; said first belt being sized so as to be loose when in said first and third configurations such that said first belt pulley does not rotate said third belt pulley and being taut when in said second configuration so that said first belt pulley operably drives said third drive pulley;
(k) a second belt reeved about said second and fourth belt pulleys; said second belt being sized so as to be loose when in said fourth and sixth configurations such that said second belt pulley does not rotate said fourth belt pulley and being taut when in said fifth configuration so that said second belt pulley operably drives said fourth drive pulley;
(l) left drive means operably connecting said left drive pulley with said left drive wheel such that said left drive wheel is rotated in the same direction as said left drive pulley and right drive means operably connecting said right drive pulley to said right drive wheel such that said right drive wheel is rotated in the same direction as said right drive pulley;
(m) left and right control arms operably connected respectively to said left and right drive pulleys to allow an operator to selectively shift between said configuration by selectively swinging the left and right pivot arms;
(n) dampening means operably connected to said left and right control handles and operably providing resistance to a shift between configurations; and
(o) return to neutral means for operably urging said left drive pulley into said third configuration and said right drive pulley into said sixth configuration so as to require an operator to use force to move from said third configuration to said first and second configurations and to also use force to move from said sixth configuration to said fourth and fifth configurations.

* * * * *